(12) United States Patent
Wang et al.

(10) Patent No.: US 6,917,711 B1
(45) Date of Patent: Jul. 12, 2005

(54) EMBEDDED QUADTREE WAVELETS IN IMAGE COMPRESSION

(75) Inventors: Meng Wang, Vancouver (CA); Yi Xiong, Burnaby (CA)

(73) Assignee: Digital Accelerator Corporation (CA)

( * ) Notice: Subject to any disclaimer, the term of this patent is extended or adjusted under 35 U.S.C. 154(b) by 0 days.

(21) Appl. No.: 09/762,631

(22) PCT Filed: Aug. 10, 1999

(86) PCT No.: PCT/CA99/00739

§ 371 (c)(1),
(2), (4) Date: Apr. 16, 2001

(87) PCT Pub. No.: WO00/10131

PCT Pub. Date: Feb. 24, 2000

Related U.S. Application Data
(60) Provisional application No. 60/096,007, filed on Aug. 10, 1998.

(51) Int. Cl.[7] .................................................. G06K 9/36
(52) U.S. Cl. .......................... 382/232; 382/233; 382/240
(58) Field of Search ................................. 382/232, 233, 382/239–240, 248, 280; 341/79

(56) References Cited

U.S. PATENT DOCUMENTS

| | | | |
|---|---|---|---|
| 5,412,741 A | | 5/1995 | Shapiro |
| 5,563,960 A | * | 10/1996 | Shapiro ...................... 382/239 |
| 5,748,903 A | | 5/1998 | Agarwal |
| 5,764,807 A | * | 6/1998 | Pearlman et al. ........... 382/240 |
| 6,553,072 B1 | * | 4/2003 | Chiang et al. ......... 375/240.25 |

FOREIGN PATENT DOCUMENTS

| | | |
|---|---|---|
| CA | 1 269 444 | 5/1990 |
| CA | 2268191 | 4/1998 |
| EP | 0 466 475 A2 | 1/1992 |
| WO | WO 97/38533 A1 | 10/1997 |
| WO | WO 98/19273 A1 | 5/1998 |
| WO | WO 00/04721 A1 | 1/2000 |
| WO | WO 00/101131 * | 2/2000 ............. G06T/9/40 |

OTHER PUBLICATIONS

Banham et al., A Wavelet Transform Image Coding Technique With A Quadtree Structure, Mar. 23, 1992, Proceedings of the International Conference on Acoustics, Speech, and Signal Processing (ICASSP), US, New York, IEEE, vol. Conf. 17, p. IV–653–IV–656.*

Gijbels T. et al., An ASIC–Architecture for VLSI–Implementation of the RBN–Algorighm. Proceedings of the International Conference on Pattern Recognition, US, Los Alamitos: IEEE Comp. Soc. Press, vol. Conf. 10, pp 408–412 XP000166513, ISBN: 0–8186–2062–5.*

(Continued)

*Primary Examiner*—Yon J. Couso
(74) *Attorney, Agent, or Firm*—Sterne, Kessler, Goldstein & Fox P.L.L.C.

(57) ABSTRACT

A new effective and fast method and apparatus for still image compression implements an embedded progressive sorting scheme in a quadtree-like structure. In contrast to zerotree-based methods for wavelet coding, the invented embedded quadtree wavelet (EQW) method exploits the inherent spatial self-similarity within individual layers of the multiresolution decomposition hierarchy. This self-similarity offers higher predictability of the data within the same resolution level, and therefore usually provides a higher performance in seeking a compact code. The computation involved in the EQW method is more efficient than in the zerotree wavelet coding, and the produced bitstream is more robust to channel noise. The present invention can effectively be used for object-oriented shape coding or region coding in image and video compression coding systems.

13 Claims, 9 Drawing Sheets

OTHER PUBLICATIONS

Shapiro, Embedded Image Coding Using Zerotrees of Wavelet Coefficients, Dec. 1993, Signal Processing, IEEE Transactions on, vol. 41, Issue 12, pp. 3445–3462.*

Taubman, D., "High Performance Scalable Image Compression with EBCOT," *Proceedings of the 6th International Conference on Image Processing,* Kobe, Japan, vol. 3, pp. 344–348 (1999).

Taubman, D. et al., EBCOT: Embedded Block coding with optimized truncation, ISO/IEC/JTC1/SC29/WG1/N1020R, Oct. 1998, at http://citeseer.nj.nec.com/context/1128550/0, pp. 1–89 (JPEG2000 Verification Model VM3A).

*Terminal Equipment and Protocols for Telematic Services: Information Technology–Digital Compression and Coding of Continuous–Tone Still Images,* Recommendation T.81, CCITT, The International Telegraph and Telephone Consultative Committee, 57 pages (Sep. 1992).

U.S. Appl. No. 09/743,839, entitled "Region–Based Scalable Image Coding," 32 pages.

Egger, O. et al., "Arbitrarily–Shaped Wavelet Packets For Zerotree Coding," *International Conference on Acoustics, Speech and Signal Processing—Proceedings Conference, 21,* IEEE, pp. 2335–2338 (1996).

Frajka, T. et al., "Progressive Image Coding with Spatially Variable Resolution," *Proceedings of the International Conference on Image Processing,* Los Alamitos, CA, IEEE, pp. 53–56 (1997).

Kossentini, F. et al., *Questionnaire: Embedded Quadtree Predictive Coder (EQPC),* ISO/IEC/JTC1/SC29/WG1/N666, Posted on or about Nov. 1997, at http://www.itscj.ipsj.or.jp/sc29/open/29view/29n25391.pdf, 22 pages.

Said, A. et al., "A New, Fast, and Efficient Image Codec Based on Set Partitioning in Hierarchical Trees," *IEEE Transactions on Circuits and System for Video Technology,* IEEE, vol. 6, No. 3, pp. 243–250 (Jun. 1996).

U.S. Appl. No. 09/913,485, entitled "Method And System Of Region–Based Image Coding With Dynamic Streaming Of Code Blocks," 111 pages.

* cited by examiner

EMBEDDED QUADTREE WAVELETS IN IMAGE COMPRESSION

This application is a national stage application filed under 35 U.S.C. 371 for international application PCT/CA99/00739, filed Aug. 10, 1999, which claims the benefit of U.S. Provisional Application No. 60/096,007, filed Aug. 10, 1998.

FIELD OF THE INVENTION

The present invention relates generally to image coding, and more particularly to compression and decompression of digital images.

BACKGROUND OF THE INVENTION

The advent of multimedia computing has created an increased demand for high-performance image compression systems. In the last few years, the wavelet transform has become a mainstream, base technology for image compression coding. Wavelet transforms, otherwise known as hierarchical subband decompositions, result in multi-resolution decomposition hierarchy (MDH) representations of the source image as illustrated in FIG. 1. Bit rates lower than 1 bit/pixel can be achieved through the efficient coding of the wavelet transform coefficients generated in the production of the MDH data A most important and beneficial characteristic of the wavelet coefficients generated by the transform is that most of the coefficients will possess very small amplitudes that will reduce to zeros after scalar quantization. For many image processing purposes, the importance or significance of a wavelet transform coefficient can be measured by its absolute value in relation to predetermined threshold values. A wavelet coefficient is said to be significant or insignificant, in relation to a particular threshold value, depending on whether or not its magnitude exceeds that threshold. The importance of a set of wavelet coefficients can be collectively ascertained using a "significance map". A "significance map" is a bitmap recording the location of the significant coefficients. A large fraction of the bit budget may be spent on encoding the significance map. Therefore, the compression performance of an image coding system largely relies on its efficiency in coding the significance map.

In U.S. Pat. No. 5,412,741 J. M. Shapiro disclosed an embedded zerotree wavelet algorithm called "EZW". A more efficient implementation of this invention, called set partitioning in hierarchical trees or "SPIHT" was disclosed by Said et al. in "A New, Fast, and Efficient Image Codec Based on Set Partitioning in Hierarchical Trees", A Said and W. Pearlman, IEEE Trans. On Circuits and Systems For Video Technology, Vol. 6, No. 3, June, 1996.

Because of its inherent simplicity, efficiency and competitiveness in performance to most other techniques, EZW-based coding has been considered one of the best in the image compression research community. Further, it has been chosen as a candidate technique for the new generation International Standard for image (JPEG 2000) and video (MPEG 4) coding.

EZW-based coding techniques consist of three basic methodological elements. The first element is the partial ordering of the MDH data by amplitude. By duplicating the ordering information at the decoder, such that the MDH data with larger amplitude will be transmitted first, it is assured that the transformation coefficients carrying a larger amount of information will more probably be available in reconstructing the image. Usually, the partial ordering is performed using a set of octave decreasing thresholds. The second element is the ordered bit plane transmission of refinement bits in order to achieve the embedded quantization. The third element is to make use of the cross, sub-band correlation between the amplitudes of MDH data to code the significance map.

Although the zerotree structure has proven successfull in coding MDH data, it is not the only logical exploitation of the data set's inherent regularities. EZW is not the most efficient representation when considering the compactness of the resulting code nor does the completely closed structure of the zerotree method allow for independent or parallel processing. In the case of a zerotree-coded, multi-layer representation of a visual object like an MPEG-4 object, only the base layer can be independently decoded. The decoding of all enhancement layers must rely on the information of previously decoded layers. In other words, the zerotree representation of objects inherently prevents independent decodability. This inseparability also introduces a higher susceptibility to bit errors. A single bit error could potentially, after interpretation at each succeeding resolution level, lead to decoder derailment. Finally, the closed structure of zerotree representation makes it difficult to add in new coding methods or features.

SUMMARY OF THE INVENTION

The present invention is a method of compressing grayscale and color image data with a high degree of compression performance. An objective of the present invention is to provide a compressibly efficient, fast method and system to code the significance information of the wavelet transform coefficients. A further objective is to provide a method and system of producing a compressed bit-stream that is scalable, region-based accessible, robust to errors, and independently decodable. The present invention provides a logically simple and fast method of coding that possess and a high degree of parallelism that lends itself to hardware implementation. The bit-stream produced by the present system is more robust to bit error than the prior art since all sub-band blocks are encoded independently and errors at one scale will not lead to errors in other scales.

In accordance with an aspect of the instant invention there is provided a method for encoding and decoding digital still images to produce a scalable, content accessible compressed bit stream comprising the steps of decomposing and ordering the raw image data into a hierarchy of multi-resolution sub-images; setting an initial threshold of significance and creating a significance index; determining an initial list of insignificant blocks; forming the fist of significant coefficients by encoding a significant map using a quadtree representation; recursively reducing the threshold values and repeating the encoding process for each threshold value; and then transmitting refinement bits of significant coefficients.

In accordance with another aspect of the instant invention there is provided an apparatus for encoding and decoding of digital still images that produces a scalable, content accessible compressed bit stream comprising a means of decomposing and ordering the raw image data into a hierarchy of multi-resolution sub-images; means for setting an initial threshold of significance and creating a significance index; means for determining an initial list of insignificant blocks; means of forming the list of significant coefficients by encoding a significant map using a quadtree representation; a means of recursively reducing the threshold values and repeating the encoding process; and a means by which refinement bits of significant coefficients are transmitted.

In accordance with yet another aspect of the instant invention there is provided method of decoding digital still images to produce a scalable, content accessible compressed bit stream comprising the steps of decoding the bitstream header; determining the initial threshold values and the array of initial significant pixels, insignificant bits and wavelet coefficients; decoding the significance maps; modifying the significance lists and decoding the refinement bits for each threshold level; reconstruct the wavelet coefficient array; perform the inverse wavelet transform; and reconstructing the image.

DETAILED DESCRIPTION OF PREFERRED EMBODIMENTS

Figure 1:
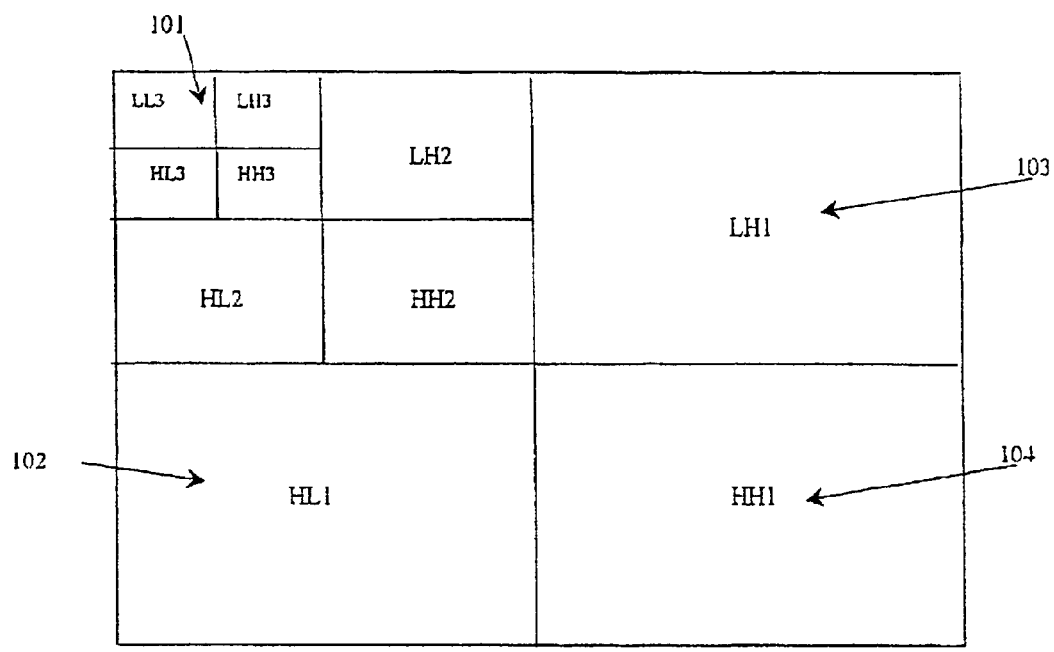
FIG. 1 is a schematic illustration of a three-layer wavelet decomposition.

When the wavelet transform of a preferred embodiment is applied to decompose an image it results in four frequency sub-band signals. These sub-bands are: high horizontal, high vertical or "HH", high horizontal low vertical "HL", low horizontal high vertical "LH", and low horizontal low vertical "LL", frequency sub-bands. The LL sub-band is then farther wavelet-transformed to produce a further set of HH, HL, HL, and LL sub-bands. This procedure is performed recursively to produce a multi-resolution decomposition hierarchy (MDH) of the original image. This is illustrated in FIG. 1 where three levels of transformation have been applied. Of course, the skilled reader will appreciate that an arbitrary number of sub-band decompositions may be applied.

In FIG. 1 the lowest frequency sub-band i.e the sub-band that provides the coarsest resolution scale, is that at the top, left-most block 101 represented by LL3. The highest frequency sub-bands or those at the finest resolution scale are the blocks HL1 102, LH1 103, and HH1 104.

Figure 1A:
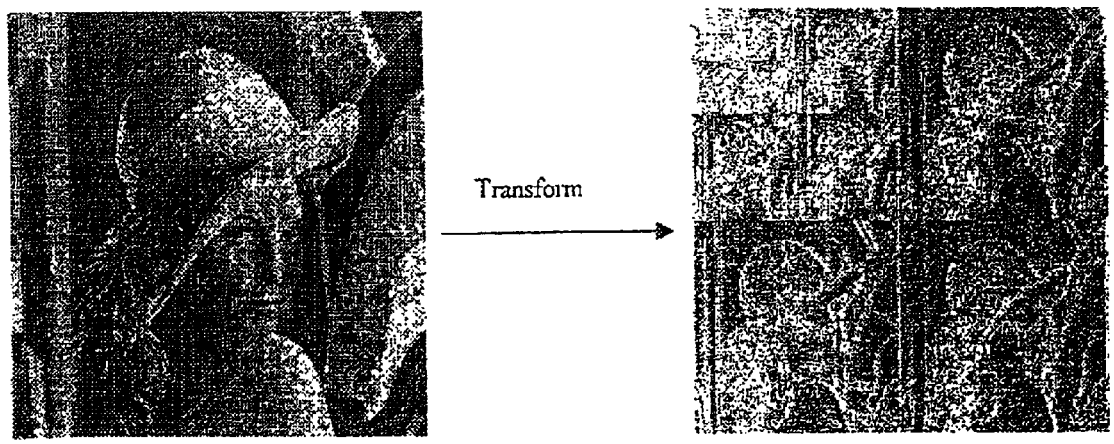
FIG. 1a is a graphic illustration of a three-layer wavelet decomposition performed on the test image "Lena".

FIG. 1a is a graphic illustration of the present invention's three layer wavelet decomposition of the test image Lena. The original image 1a01 can be seen to have 3 levels of resolution in the decomposed image 1a02. The high frequency data of HH1 104 can be seen to offer the most detail in the bottom, right-most block 1a03.

Figure 2:
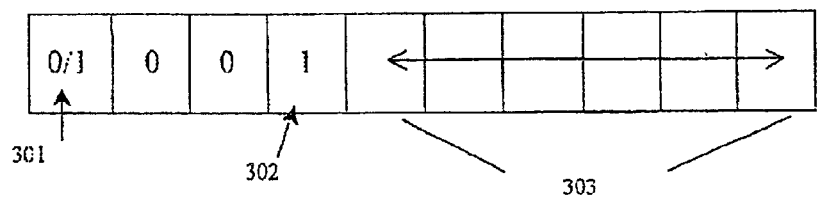
FIG. 2 illustrates the binary representation of a wavelet transform coefficient after it is converted into an integer form.

After a wavelet transform has occurred, each pixel is represented by a wavelet transform coefficient. In the preferred embodiment of the current invention, each of these coefficients is represented in a fixed-point, binary format, most typically with less than 16 bits, and treated as an integer. FIG. 2 illustrates the binary representation in the general case of a wavelet transform coefficient. In this system, the first bit 201 is dedicated to represent its sign—positive or negative. The first non-zero bit 202 following the sign bit is called the leading one bit or LOB. The position of the LOB is determined by the magnitude of the coefficient. That is to say that the larger the value of the coefficient, the more closely after the sign bit will it occur. All of the bits following the LOB 202 are called refinement bits 203.

Figure 4:
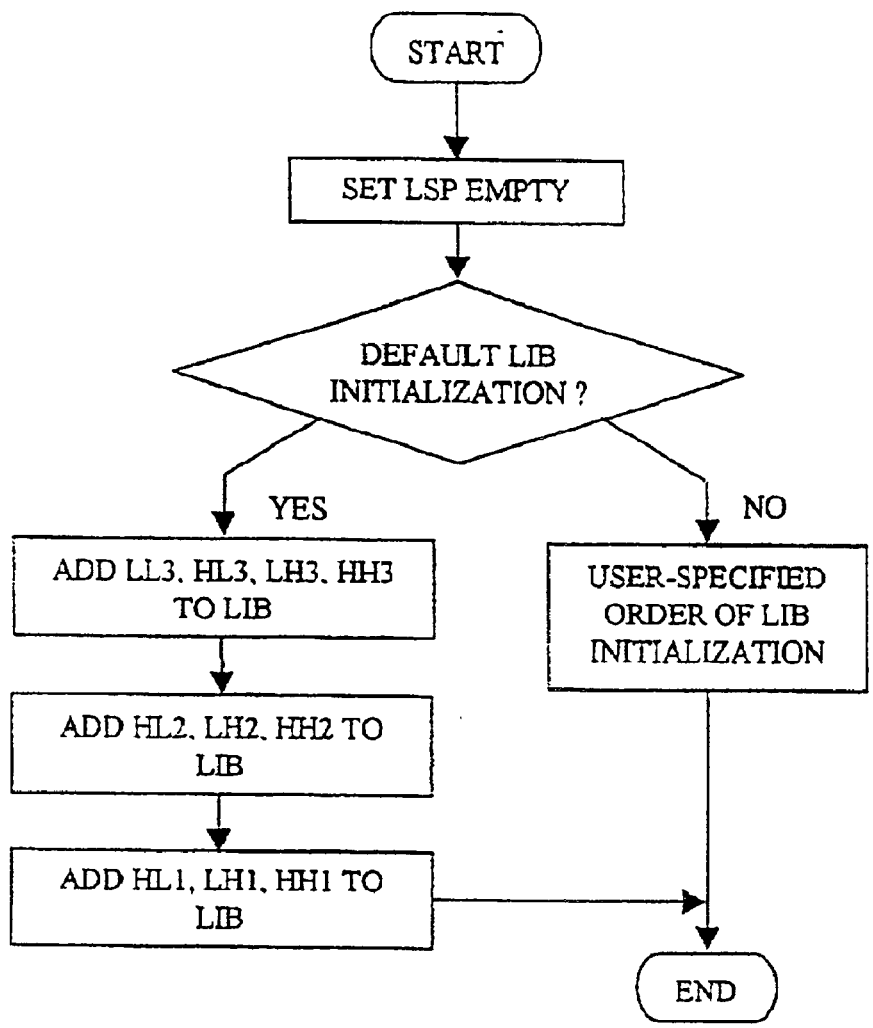
FIG. 4 is the process of initializing the lists LSP and LIB.
Figure 5:
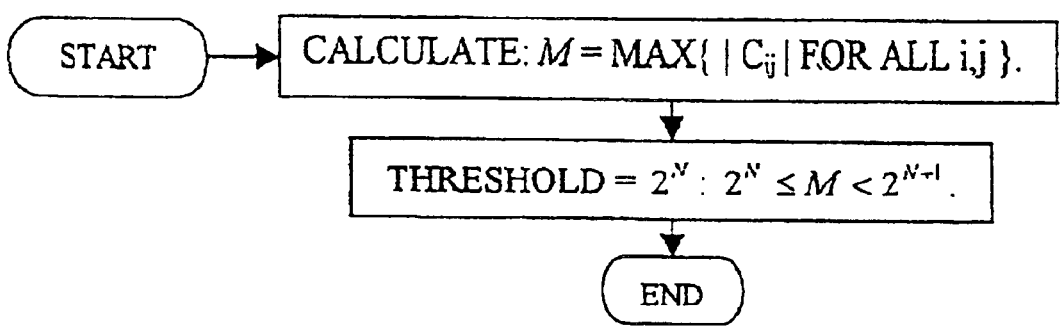
FIG. 5 illustrates the algorithm that determines the initial threshold.
Figure 6:
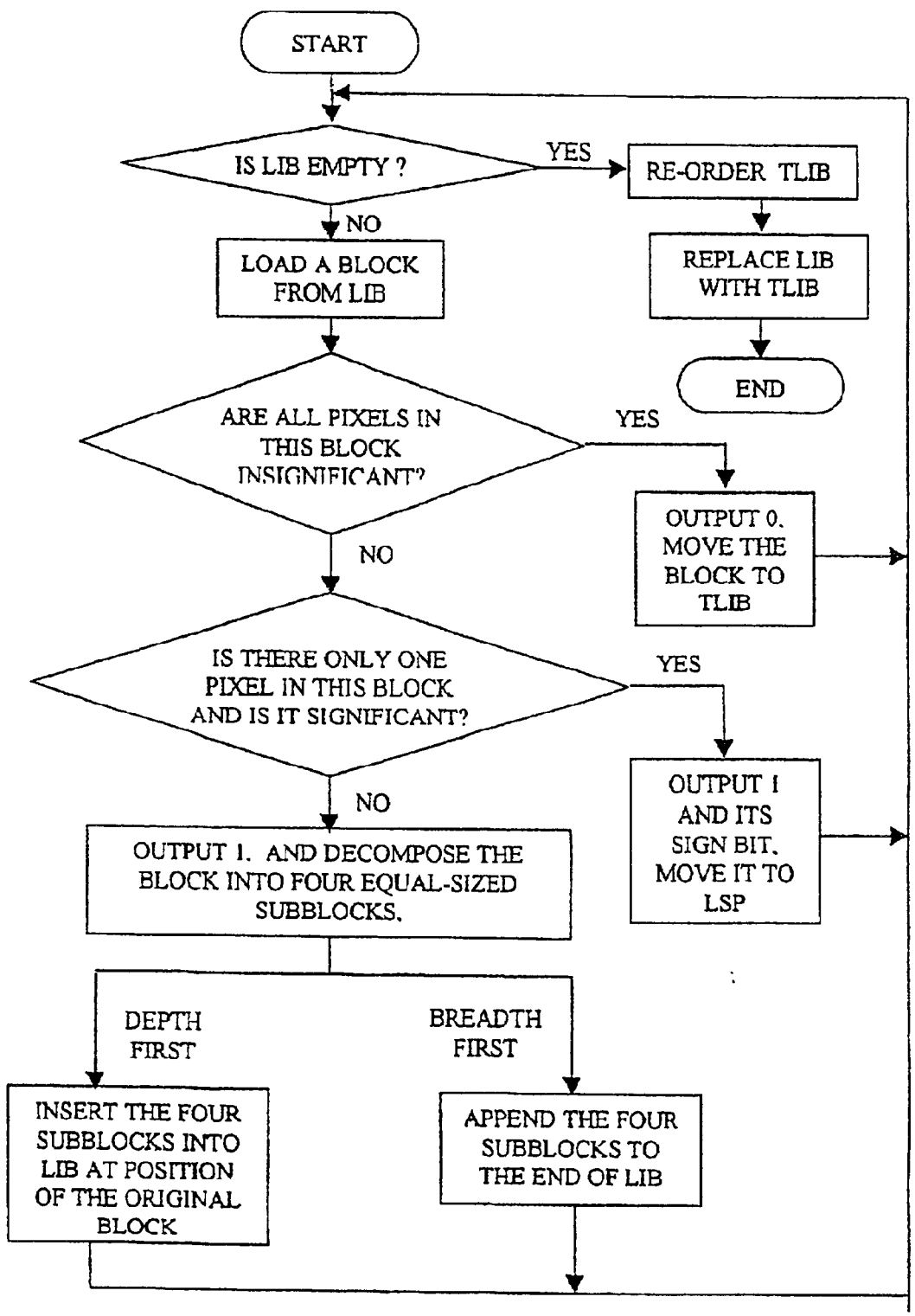
FIG. 6 is a flowchart of the quadtree coding of the significance map.

After the coefficients are generated in the wavelet transformation and are given their binary representation, three lists are initialized. The first of these is called the list of significant pixels or LSP. Each entry in LSP corresponds to an individual pixel on the MDH plane and is identified by a pair of coordinates (i,j). The LSP is initialized as an empty list since the significance of individual pixels has yet to be determined. The second list is called the list of insignificant blocks or LIB. The entries in this list are composed of the coordinates of the left-top pixel of a block of coordinates (i1,j1) plus the width and height of the block (i2,j2) measured in pixels. An entry in the LIB represents a block made up of an individual pixel when i2=j2=1. When first initialized the TLIB is empty. After the lists are initialized, each sub-band block becomes an entry in LIB. The order of the entries in the initial LIB can be arranged arbitrarily but the default order of sub-band entry is LL3, LH3, HL3, HH3, LH2, HL2, HH2, LH1, HL1, HH1. FIG. 4 represents the decision tree for the creation of LSP and the default entry into the LIB.

The next step in the fomulation of the lists is the calculation of threshold values to determine the significance of the coefficients. After the wavelet transform, the maximum magnitude "M" of all transform coefficients must be determined. One skilled in the art is familiar with the fact that the vast majority of coefficients from an efficiently implemented MDH will have relatively low values. Once M has been determined, a value N is found which satisfies the condition: $2^N \leq M < 2^{N+1}$. The initial threshold is set at $2^N$, and the set of various N values is called the threshold index. The threshold values then decrease by powers of 2 for ease of bit-wise computation. At each threshold value a significance map is produced by comparing the coefficients with the threshold value. Those coefficients that exceed the threshold are given a value of 1 and thus join the map of significant coefficients. Coefficients less than the threshold value are given a value of zero in that significant map. A significance map for each threshold value, in the form of a binary image is thus produced.

Recalling that the LIB is first composed of the sub-band blocks of the MDH, the preferred embodiment of the present invention, begins the quadtree encoding of the significance data. For the given block, we count the number of significant coefficients in this block. If the number is zero the identifying coordinates of this square are added to TLIB. If there is at least one significant coefficient in this block, "the parent block", it is divided into four equal-sized sub-blocks called "child blocks" and then removed from the LIB. In the event that the number of significant coefficients is one, and the size of the block is one, this entry is a single coefficient and its coordinates are moved to LSP.

There are two methods available to process the sub-blocks. The first method, known as depth-first quadtree coding, inserts the four sub-blocks into LIB immediately following the position of their parent block. The four child blocks are then evaluated immediately with respect to their significance and this operation is applied recursively until no more subdivision is possible. When all significant coefficients in this block are found and moved into LSP, the coding of the present entry is completed. The process then moves to the next block in the LIB.

The second method, or breadth-first quadtree coding, adds these four sub-blocks to the end of LIB where they are evaluated before the same pass ends. With the breadth-first process; all parent squares at the same level will be processed before any blocks of the next generation.

After all entries in the present LIB have been processed at one level of significance, the entries in TLIB are reordered according to the size of the block: each block must be put before those blocks with larger size so that it can be processed first for the next threshold. Most pixels adjacent to significant pixels have been moved into TLIB as pixel level entries if not significant to the present threshold. Due to the correlation of adjacent coefficients it is very likely that these adjacent pixels will be significant at the next threshold level. In the event of a strict bit budget, we must put these pixel level blocks first to ensure that precious bits are not used to find significant coefficients from big blocks, and risk missing pixel level significant coefficients. The reordering of TLIB will therefore aid the encoding of more significant coefficients using fewer bits. While not essential, experiments show that higher PSNR will be achieved using this reordering scheme. The final step in this quadtree process is to replace the LIB with TLIB for subsequent scanning at the next level of significance and to reset TLIB to empty. Before moving to the next threshold however, the refinement data for significant coefficients is collected.

Figure 3:
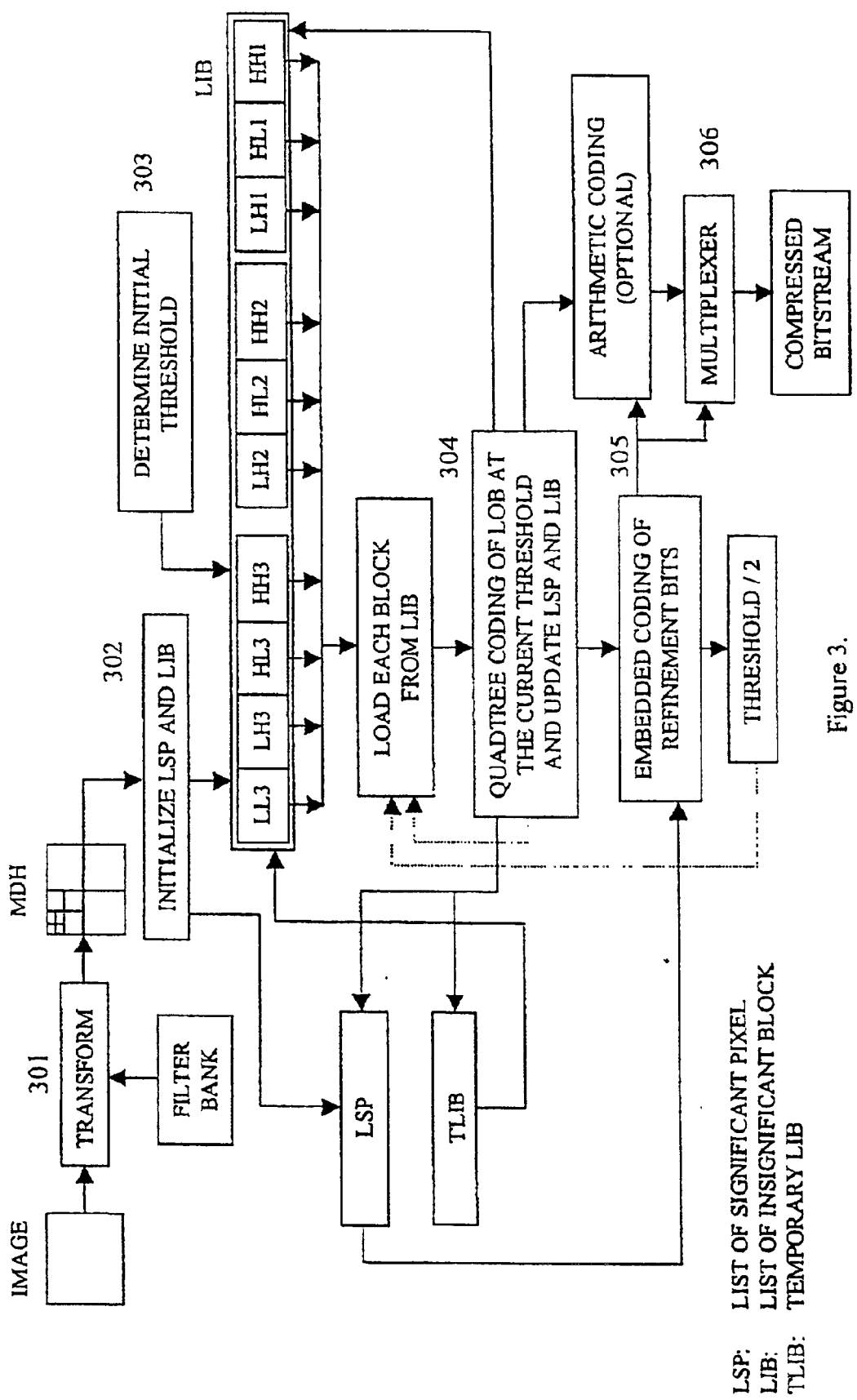
FIG. 3 is a block diagram of the invented image encoder.
Figure 7:
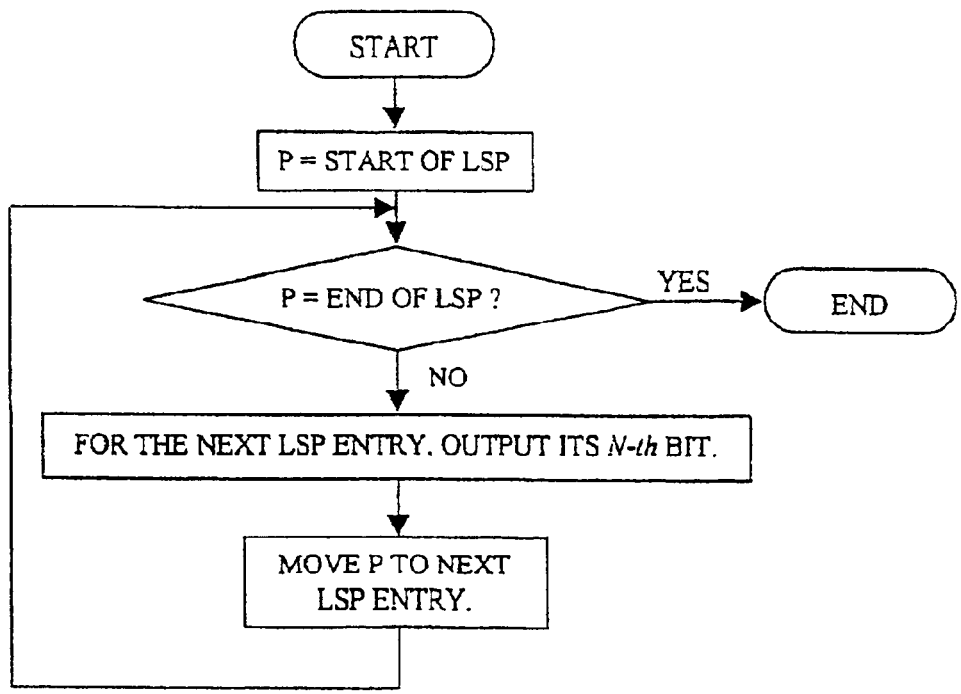
FIG. 7 is a flowchart of the refinement process.
Figure 8:
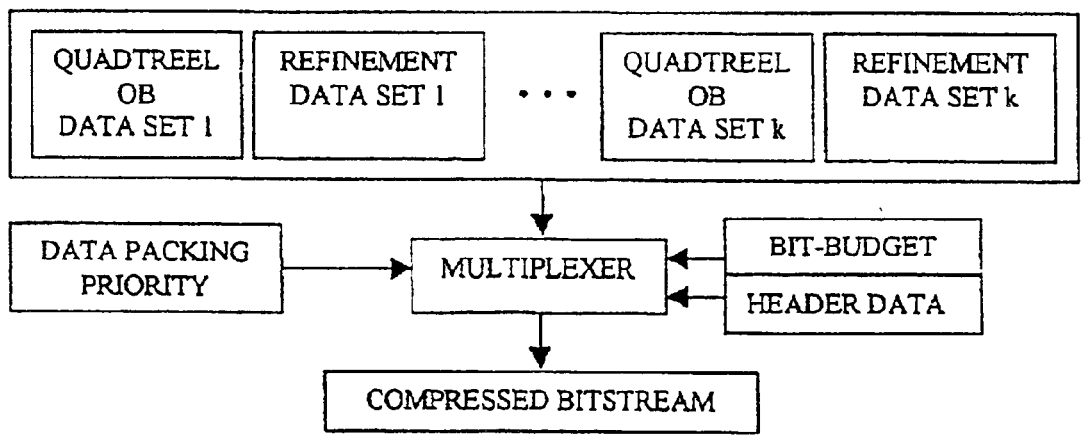
FIG. 8 is a block diagram of the multiplexer.

FIG. 7 illustrates the refinement pass, in the quadtree encoding of the image data. For those coefficient entries of LSP that are significant at threshold $2^{N+1}(|c_{i,j}| \geq 2^{N+1})$, output its N-th bit. As illustrated in FIG. 3 and discussed above, following the refinement pass, the threshold is divided by 2 and the above process resumes with the new LIB—formerly the TLIB—and the new threshold value.

Figure 9:
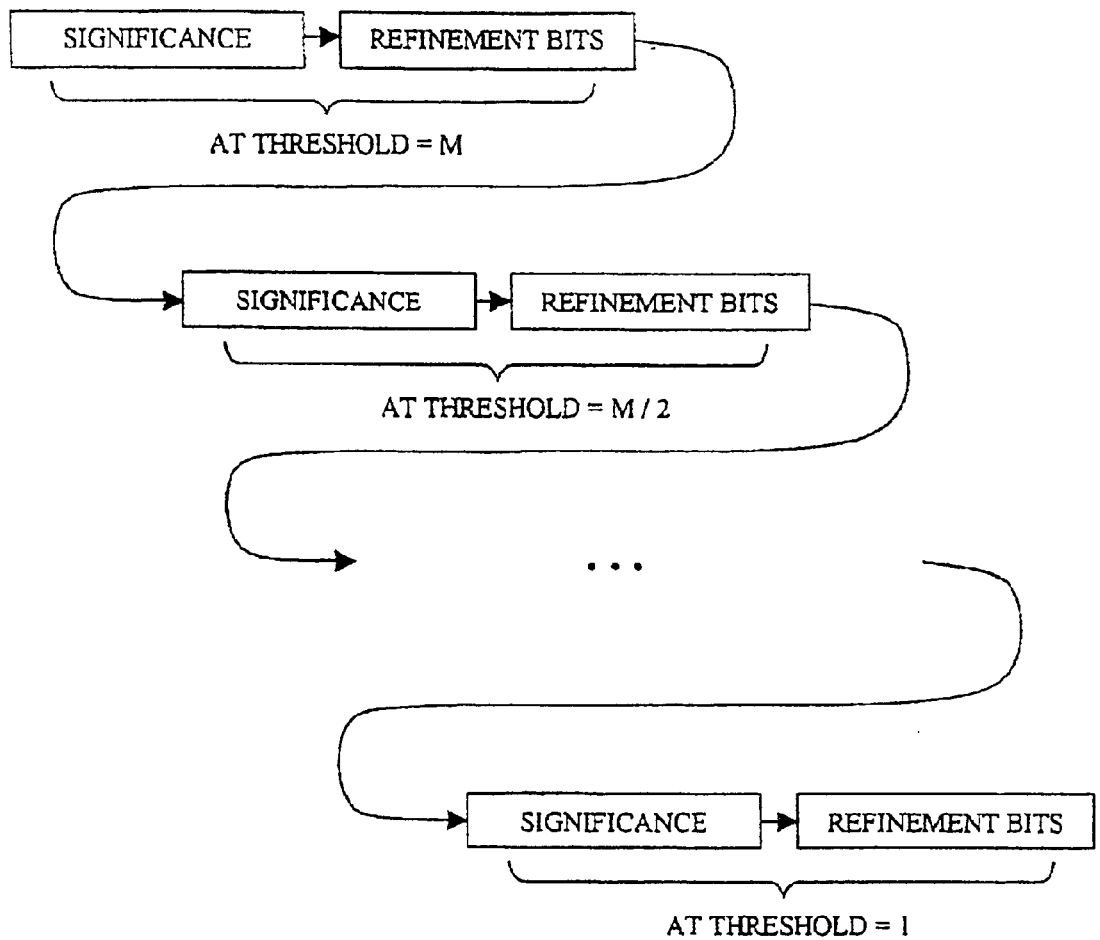
FIG. 9 illustrates the default order of data packing.
Figure 10:
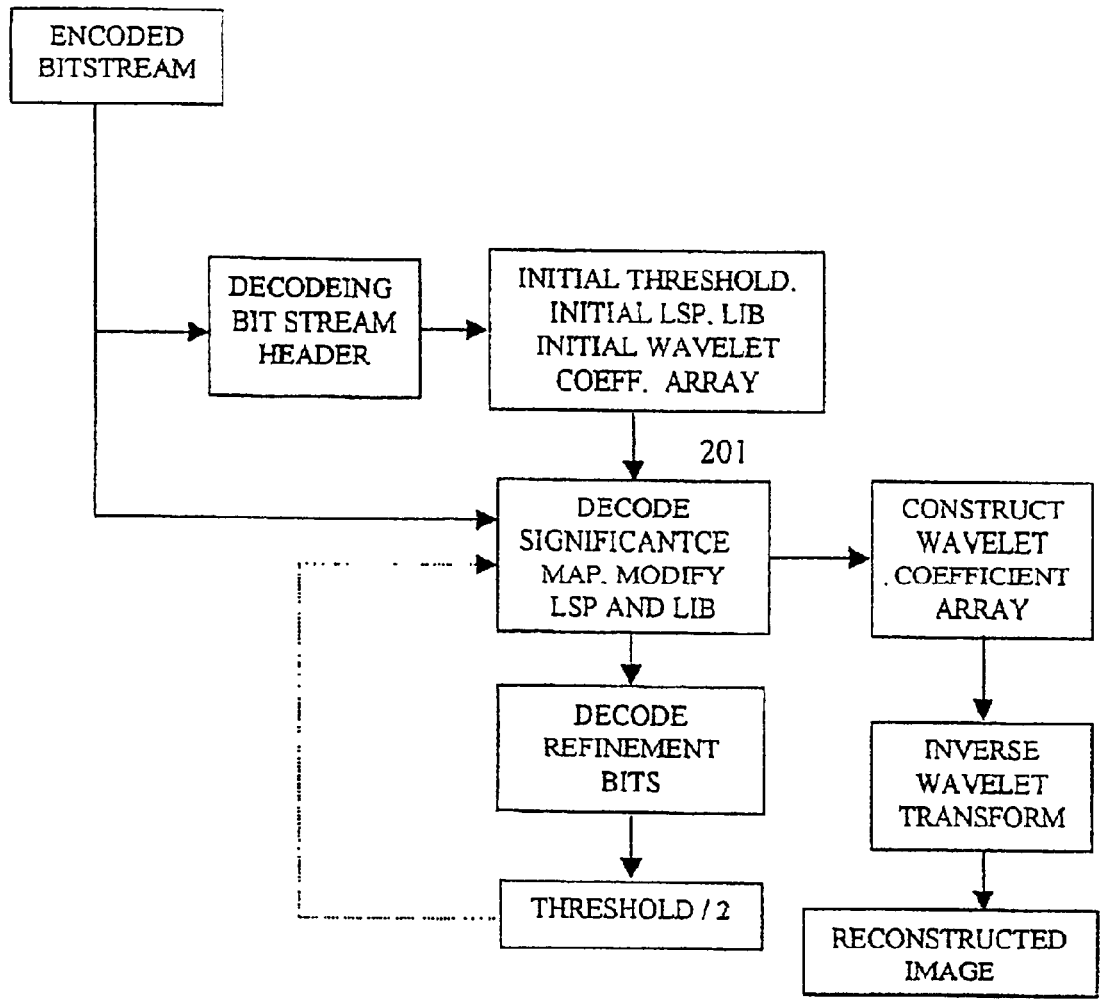
FIG. 10 is a block diagram of the image decoder of the invention.

The arithmetic coding of the bit stream produced by the above process is not essential. There are two types of data in the bit-stream quadtree-coded significance map encoding bits and refinement bits, which form a completely embedded code. There are many ways to organize this bitstream. In theory, the significance map data and the refinement bits data can be merged together in any order. This is handled by a multiplexer which packs the data according to user-specified priority. The default order of data packing is illustrated in FIG. 9 and ensures optimum results when high PSNR is pursued.

At the first stage of decoding, the following information must be reconstructed from the header bits: the starting threshold index N, the number of wavelet scales, and the image size. Based on the above information, we can initialize and fill LIB while the initial LSP and TLIB are set empty. The initial value of all wavelet coefficients is set to zero.

Figure 11:
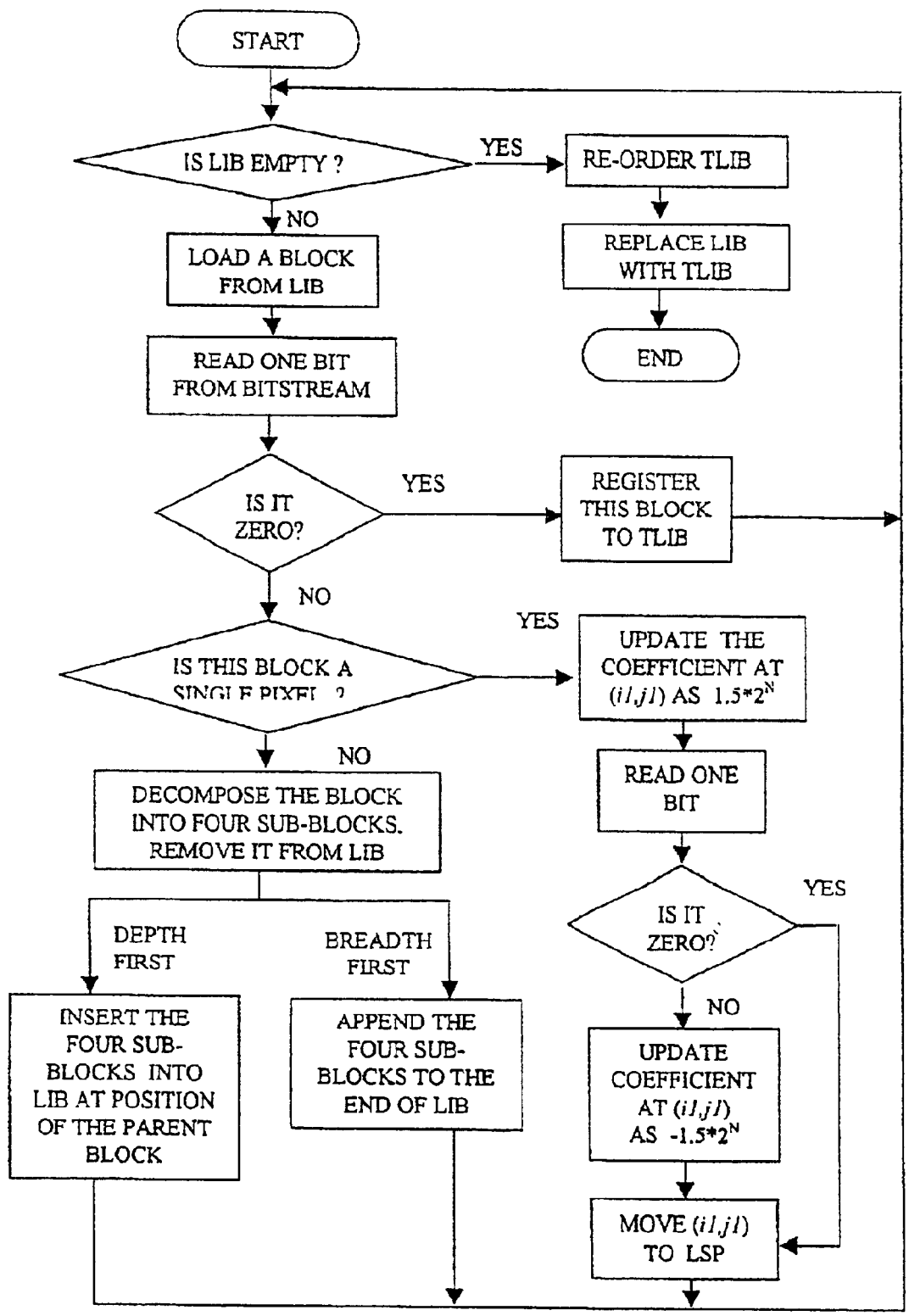
FIG. 11 is a flowchart of the quadtree decoding of the significance map.

The key process of decoding is illustrated in FIG. 11, in which the significance map at a given threshold level is decoded based on the received bits. Assuming the present threshold index is N, the process first loads an entry from the LIB and reads one bit from the bitstream. If the bit value is zero, this entry is moved to TLIB. In the alternative, the entry is checked to determine if its size is one. If the entry is a single pixel, then update the wavelet coefficient at the current position as $2^N+2^{N-1}$, and read in one more bit. If this bit is a 1, update the coefficient at this position as $-(2^N+2^{N-1})$. The entry is then moved into the LSP. If the entry is not at pixel level, the process decomposes it into four equal sized sub-blocks. If the encoder has used the depth-first method (this decision having been made by the encoder and which information is contained in the header part of the bitstream), insert the sub-blocks into LIB at its parent block position. If the encoder has used the breadthfirst method, add the sub-blocks to the end of LIB. After all entries in LIB have been decoded, using TLIB to replace LIB, which will be processed at the next threshold level. The LIB is reordered according to the same rule as in encoding, and the TLIB is reset as empty.

In the refinement pass of the decoding, all coefficients, which have been moved into LSP, are updated according to following rule: if the coefficient is negative, then add $2^{N-1}$ if received bit is 0, or subtract $2^{N-1}$ if received bit is 1. On the contrary, if the coefficient is positive, then add $2^{-1}$ if received bit is 1, or subtract $2^{-1}$ if received bit is 0.

At any point in the encoding or decoding process of the present invention, bit consumption may be calculated to determine if the bit budget has been exceeded and the process may be halted. In this manner, precise bit rate control can be easily achieved if there is no arithmetic coding on the bit stream. With arithmetic coding, the resultant bitstream is usually shorter than the desired length.

We claim:

1. A method for encoding a digital still image to produce a compressed bit stream, said method comprising the steps of:

a) decomposing and ordering the digital still image into a hierarchy of multi-resolution images, wherein each multi-resolution image comprises a set of one or more transform coefficients, wherein each transform coefficient has a magnitude and wherein each transform coefficient represents a pixel of said digital still image;

b) initializing a list of insignificant blocks, a temporary list of insignificant blocks and a list of significant pixels as empty sets, wherein after initialization and during processing the list of insignificant blocks is used to store one or more blocks of transform coefficients for which all transform coefficients are insignificant for a particular threshold value or have not yet been evaluated for significance, the temporary list of insignificant blocks is used to store one or more blocks of transform coefficients for which all transform coefficients have been evaluated to be insignificant for a particular threshold value and the list of significant pixels comprises one or more transform coefficients which have been evaluated to be significant for a particular threshold value;

c) entering each multi-resolution image as a block of transform coefficients into the list of insignificant blocks in an arbitrary sequence;

d) determining an initial threshold value based on the transform coefficient having the largest magnitude;

e) generating a significance map related to a selected threshold value and encoding said significance map using a quadtree representation, wherein said significance map is determined by the evaluation of the significance of the blocks of transform coefficients within the list of insignificant blocks in relation to this selected threshold value, wherein the sequence of evaluation is performed according to the sequence in which the blocks of transform coefficients were entered into the list of insignificant blocks and wherein a transform coefficient greater than or equal to the selected threshold value is significant in relation to this selected threshold value; and f) generating the compressed bit stream, wherein said bit stream contains a bit stream header comprising information relating to method of generation of said compressed bit stream.

2. The method defined in claim 1, wherein said determining of a significance map comprises the steps of:

1) evaluating a block of transform coefficients contained in the list of insignificant blocks, wherein blocks of transform coefficients are evaluated in the sequence which they are initially entered into the list of insignificant blocks;

2) comparing the magnitude of each transform coefficient of said block with the selected threshold value to determine if said block of transform coefficients is significant, wherein a block containing only insignificant transform coefficients is transferred to the temporary list of insignificant blocks;

3) transferring said block of transform coefficients to the list of significant pixels when said block of transform coefficients comprises one significant transform coefficient;

4) otherwise subdividing said block of transform coefficients into sub-blocks of transform coefficients and entering these sub-blocks into the list of insignificant blocks, if said block of transform coefficients contains at least one significant transform coefficient;

5) sequentially repeating steps 1) to 4) for each block of transform coefficients within the list of insignificant blocks until said list of insignificant blocks is empty;

6) generating output bits using the list of significant pixels;

7) arranging the blocks of transform coefficients contained in the temporary list of insignificant blocks based on specified criteria;

8) replacing the list of insignificant blocks with the temporary list of insignificant blocks; and 9) decreasing the selected threshold value by a predetermined value and generating a significance map for this new selected threshold value;

wherein said selected threshold value is sequentially decreased to a predetermined level.

3. The method defined in claim 1, wherein a refinement bit for each transform coefficient in the list of significant pixels for a particular specified threshold value is determined and incorporated in the bit stream after the significance map for the particular specified threshold value, wherein a refinement bit is a predetermined bit of the transform coefficient.

4. The method defined in claim 1, wherein the decomposing and ordering of the digital still image into a hierarchy of multi-resolution sub-images is performed using a wavelet transformation.

5. The method defined in claim 1, further comprising the step of implementing a multiplexing protocol that assembles compressed data from different regions and resolution channels into an integrated bit-stream enabling both an encoder and a decoder to selectively and interactively control a bit budget and the quality of the compressed images.

6. An apparatus for encoding a digital still image that produces a compressed bit stream, said apparatus comprising:

a) means for decomposing and ordering the digital still image into a hierarchy of multi-resolution images, wherein each multi-resolution image comprises a set of one or more transform coefficients, wherein each transform coefficient has a magnitude and wherein each transform coefficient represents a pixel of said digital still image;

b) means for initializing a list of insignificant blocks, a temporary list of insignificant blocks and a list of significant pixels as empty sets, wherein after initialization and during processing the list of insignificant blocks is used to store one or more blocks of transform coefficients for which all transform coefficients are insignificant for a particular threshold value or have not yet been evaluated for significance, the temporary list of insignificant blocks is used to store one or more blocks of transform coefficients for which all transform coefficients have been evaluated to be insignificant for a particular threshold value and the list of significant pixels comprises one or more transform coefficients which have been evaluated to be significant for a particular threshold value;

c) means for entering each multi-resolution image as a block of transform coefficients into the list of insignificant blocks in an arbitrary sequence;

d) means for determining an initial threshold value based on the transform coefficient having the largest magnitude;

e) means for generating a significance map related to a selected threshold value and encoding said significance map using a quadtree representation, wherein said significance map is determined by the evaluation of the significance of the blocks of transform coefficients within the list of insignificant blocks in relation to this selected threshold value, wherein the sequence of evaluation is performed according to the sequence in which the blocks of transform coefficients were entered into the list of insignificant blocks and wherein a transform coefficient greater than or equal to the selected threshold value is significant in relation to this selected threshold value; and f) means for generating the compressed bit stream, wherein said bit stream contains a bit stream header comprising information relating to the method of generation of said compressed bit stream.

7. The apparatus defined in claim 6, wherein said means for determining a significance map comprises:

1) means for evaluating a block of transform coefficients contained in the list of insignificant blocks, wherein blocks of transform coefficients are evaluated in the sequence which they are initially entered into the list of insignificant blocks;

2) means for comparing the magnitude of each transform coefficient of said block with the selected threshold value to determine if said block of transform coefficients is significant, wherein a block containing only insignificant transform coefficients is transferred to the temporary list of insignificant blocks;

3) means for transferring said block of transform coefficients to the list of significant pixels when said block of transform coefficients comprises one significant transform coefficient;

4) means for otherwise subdividing said block of transform coefficients into sub-blocks of transform coefficients and entering these sub-blocks into the list of insignificant blocks, if said set of transform coefficients contains at least one significant transform coefficient;

5) means for sequentially repeating the steps performed by means 1) to 4) for each block of transform coefficients within the list of insignificant blocks until said list of insignificant blocks is empty;

6) means for generating output bits using the list of significant pixels;

7) means for arranging the sets of transform coefficients contained in the temporary list of insignificant blocks based on specified criteria;

8) means for replacing the list of insignificant blocks with the temporary list of insignificant blocks; and 9) means for decreasing the selected threshold value by a predetermined value and generating a significance map for this new selected threshold value;

wherein said selected threshold value is sequentially decreased to a predetermined level.

8. The apparatus defined in claim 6, wherein a refinement bit for each transform coefficient in the list of significant pixels for a particular specified threshold value is determined and incorporated in the bit stream after the significance map for the particular specified threshold value, wherein a refinement bit is a predetermined bit of the transform coefficient.

9. The apparatus defined in claim 6, wherein the means for decomposing and ordering the digital still image into a hierarchy of multi-resolution sub-images uses a wavelet transformation.

10. The apparatus defined in claim 6, further comprising a multiplexing means that assembles compressed data from different regions and resolution channels into an integrated bit-stream enabling both an encoder and a decoder to selectively and interactively control a bit budget and the quality of the compressed images.

11. A method for decoding a compressed bit stream to produce a digital still image, said method comprising the steps of:

a) decoding a bit stream header associated with the compressed bit stream, wherein the bit stream header comprises information relating to the method of generation of said compressed bit stream;

b) generating an initial list of insignificant blocks based on the decoded bit stream header;

c) initializing an empty list of significant pixels;

d) initializing a wavelet coefficient array based on the decoded bit stream header;

e) generating a current threshold value based on the decoded bit stream header;

f) decoding a quad-tree encoded significance map from the list of insignificant blocks based on the current threshold value;

g) modifying the list of significant pixels and the list of insignificant blocks of pixels according to said decoding;

h) decoding refinement bits of wavelet coefficients wherein the coefficients of all pixels moved to the list of significant pixels are updated based on said decoded refinement bits;

i) reducing the current threshold and repeating steps f) to h) to obtain a further significance map using the reduced threshold value until all significance maps in the compressed bit stream have been generated;

j) constructing said wavelet coefficient array based on said significance maps; and k) reconstructing the digital still image from said wavelet coefficient array using an inverse wavelet transform.

12. The method according to claim 1, wherein the compressed bit stream is a compressed data file.

13. The apparatus according to claim 6, wherein the compressed bit stream is a compressed data file.

* * * * *